INVENTOR.
KARL D. KRYTER

Aug. 2, 1960  K. D. KRYTER  2,947,349
SEAT AND SEATING ARRANGEMENT
Filed April 10, 1958  3 Sheets-Sheet 2

INVENTOR.
KARL D. KRYTER
BY
ATTORNEYS

Aug. 2, 1960 K. D. KRYTER 2,947,349
SEAT AND SEATING ARRANGEMENT
Filed April 10, 1958 3 Sheets-Sheet 3

INVENTOR.
KARL D. KRYTER
BY
ATTORNEYS

United States Patent Office 2,947,349
Patented Aug. 2, 1960

2,947,349

SEAT AND SEATING ARRANGEMENT

Karl D. Kryter, 154 Hampshire Road,
Wellesley Hills, Mass.

Filed Apr. 10, 1958, Ser. No. 727,745

5 Claims. (Cl. 155—130)

(Granted under Title 35, U.S. Code (1952), sec. 266)

The invention described herein may be manufactured and used by or for the United States Government for governmental purposes without payment to me of any royalty thereon.

This invention relates to an improved seating arrangement for multiple-seat vehicles or rooms. More particularly, the invention is concerned with providing a seating arrangement adaptable for use in large passenger-carrying vehicles, especially airliners, which allows considerably more passenger comfort without any appreciable increase in the space requirements.

One of the most important considerations in the designing and building of modern passenger-carrying vehicles, especially those which travel long distances, is the comfort and convenience of the passengers. Long, non-stop airline flights, such as transoceanic or cross-country, are particularly tiring to the passengers because of the limited space which allows only restricted movement of most parts of the body.

The legs and feet are usually most adversely affected by the cramped position in which the passenger must remain during the trip. It is well known that when the level of the feet and legs is raised somewhat above the floor and allowed to rest in this raised position, much of the discomfort caused by inactivity can be eliminated. However, a difficulty is encountered in providing this added comfort because, ordinarily, more space would be required, thereby adding to the operating expenses by reducing the carrying capacity of the aircraft or vehicle. The present invention includes a novel and unique arrangement whereby the additional comfort and convenience are provided without reducing a pay load of the carrier.

Accordingly, it is an object of the present invention to provide an improved seating arrangement for use in passenger-carrying vehicles, particularly aircraft, whereby, during relatively long trips, the passengers can relax and stretch their legs so that the trip may be generally more comfortable and less tiring.

Another object of the present invention is to provide this added comfort and convenience without sacrificing any significant portion of the seating capacity or pay load of the carrier.

A further object of the invention is to provide a combination foot and arm rest in which the feet of one passenger are allowed to rest in an enclosed foot stool which also serves as an arm rest for one or more of the other passengers.

A still further object of the invention is to provide a leg rest to be used with the foot rest so that the passenger can rest his legs in an extended position while riding for relatively long periods of time. The leg rest is slidable into the foot rest when not in use, thus allowing unrestricted use of the space between the seats.

One of the features of the invention is the inclusion of a folding tray attached to the foot rest and useful as a table for holding food and beverages and as a writing surface or platform for holding books and magazines. This tray folds away from the passenger when not in use so as not to affect the accessibility of the seat to the passenger.

These and other objects, features, and advantages will become more apparent after considering the following detailed description taken in conjunction with the annexed drawings wherein.

Figure 1:
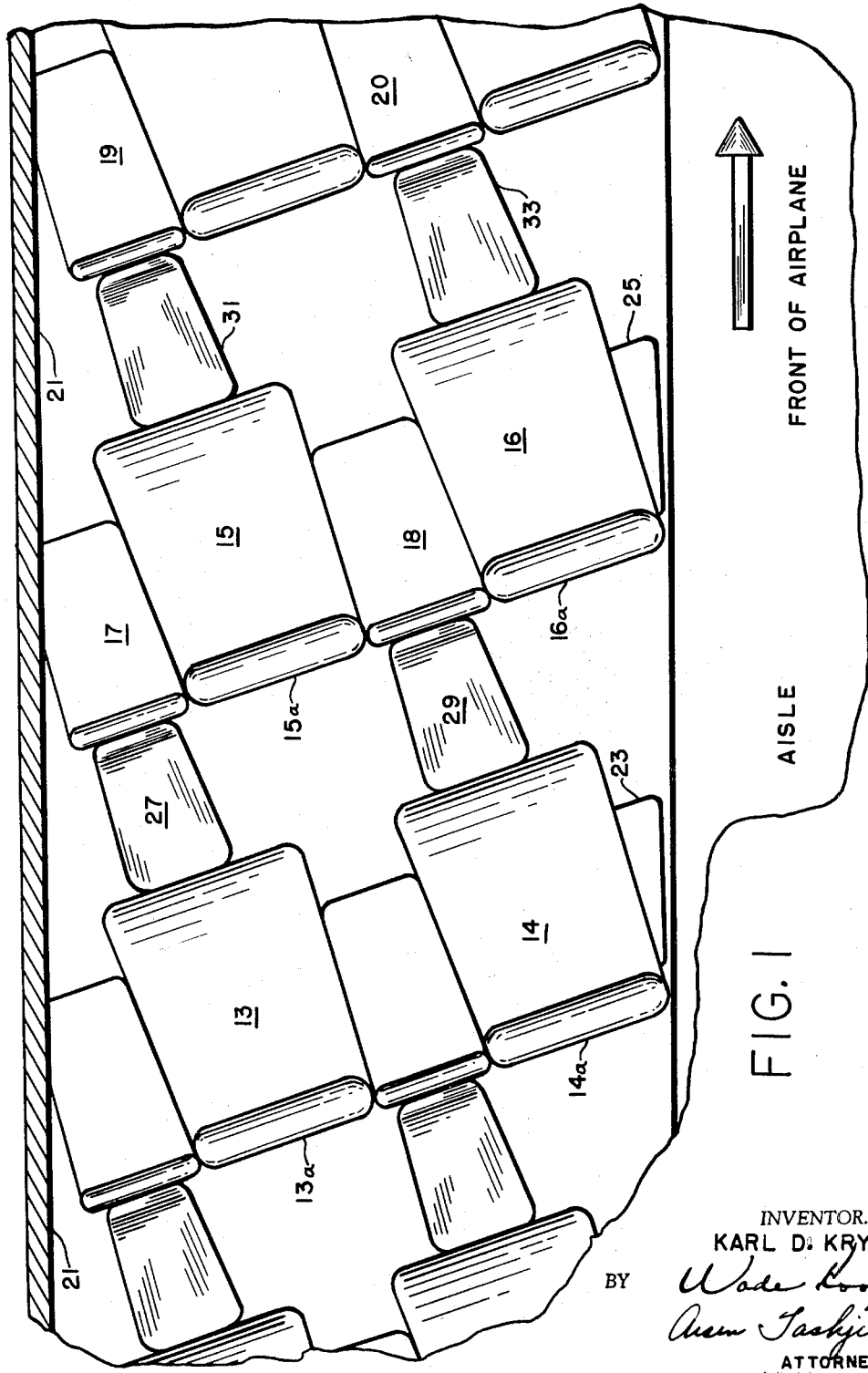
Fig. 1 is a diagrammatic view of the seating arrangement installed in an aircraft, showing relative positions of the seat, leg rest and foot rest.

Referring now to Fig. 1, there is shown a general view of seating arrangement looking downward from above. Items 13, 14, 15, and 16 represent the seat portions and items 13a, 14a, 15a, and 16a represent the back rest of each of the respective seats.

All of the seats have corresponding foot rests numbered 17, 18, 19, and 20. Each of the foot rests includes an open end portion to allow the passenger occupying the seat directly behind the foot rest to insert his feet therein. In practice, an occupant of seat 13 utilizes the foot rest 17, the occupant of seat 14 uses the foot rest 18 and other passengers use the other foot rests. It will be noted that these foot rests are located between each of the seats. For example, foot rest 18 is located between seats 15 and 16. By locating foot rest 18 in this manner, it also serves as an arm rest for the occupants of seats 15 and 16. On the other side of seat 15, positioned between the airplane fuselage 21 and the seat, there is located the foot rest 17 used by the occupant of seat 13. This foot rest 17, also serves as an arm rest for the occupant of seat 15. Items 23 and 25 serve as arm rests for passengers in seats 14 and 16 respectively.

Between each of the seats and its corresponding foot rest are located the leg rests 27, 29, 31, and 33. These leg rests serve to support the legs of the occupant of the seat. When not in use, each of the leg rests may be slid into its corresponding foot rest, thus leaving the floor space between the seats free of any obstruction.

Figure 2:
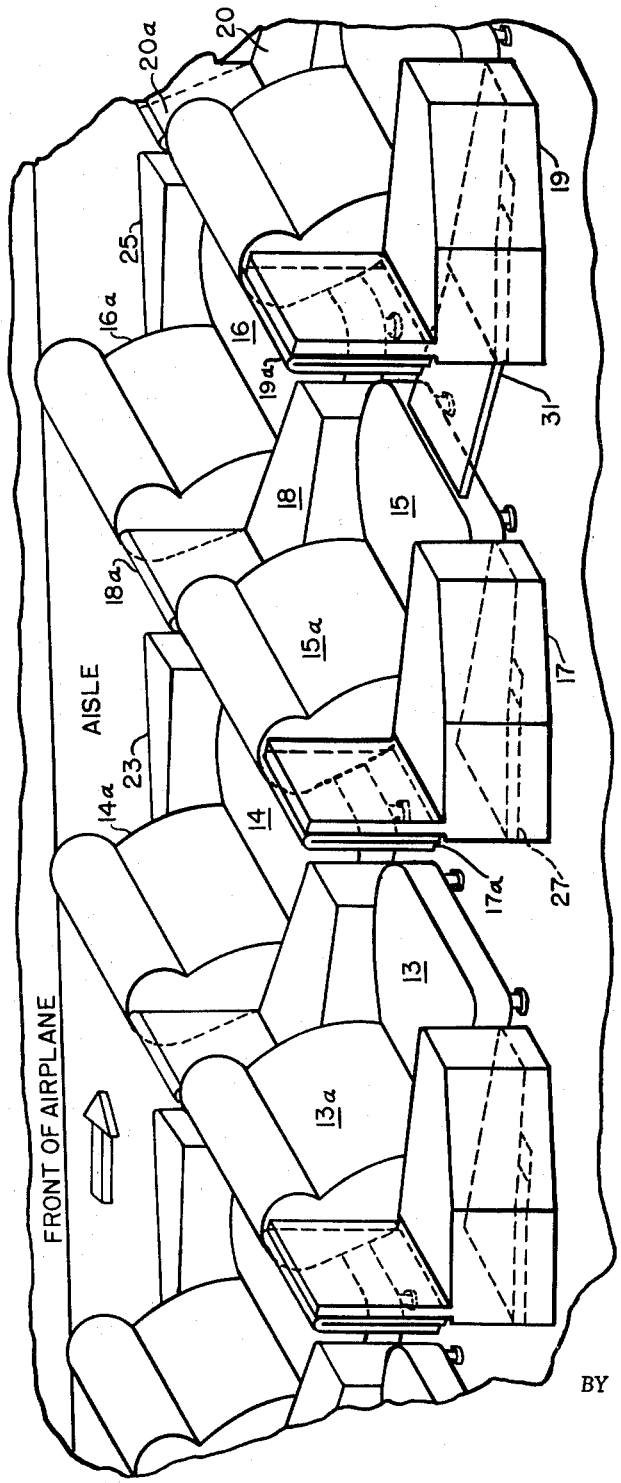
Fig. 2 is a general view of the seats and rests, showing a two abreast arrangement which would be useful in a commercial airliner.
Figure 4:
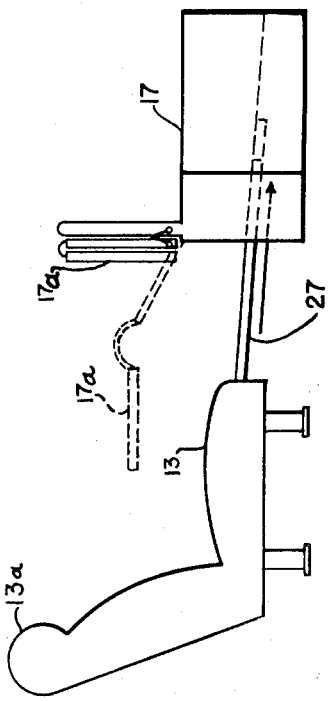
Fig. 4 is a side elevation of a single seat, leg rest, and foot rest showing the folding tray attached to the foot rest in both the open and closed positions.

A general view of the seating arrangement looking from the outside of the airplane toward the center aisle is shown in Fig. 2. It will be noted that the foot rests, 17, 18, 19, and 20 have folded trays 17a, 18a, 19a, and 20a attached near the upper part of the front openings. When unfolded, these trays serve as holders for food and beverages or may be useful as writing surfaces. Any convenient means may be employed to fold and unfold the trays and to hold them in the locked position after unfolding. The position of the tray 17a in unfolded position is shown by dotted lines in Fig. 4.

Figure 3:
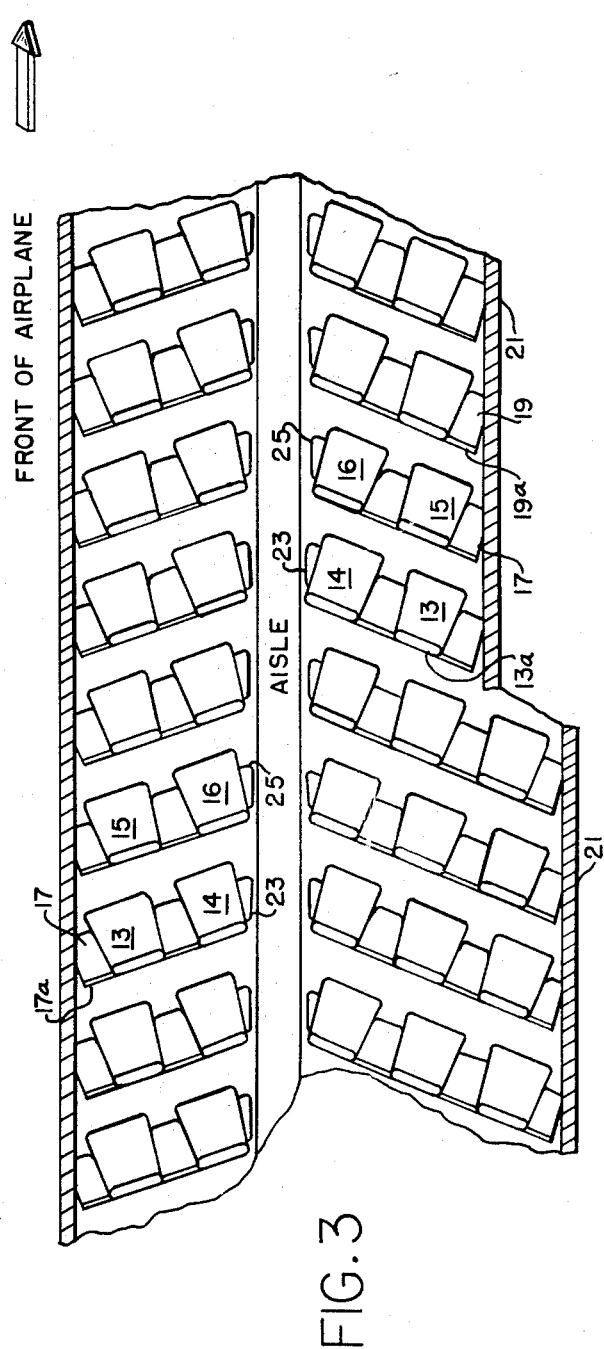
Fig. 3 is a diagrammatic view of the seating arrangement as applied for use in two specific types of commercial aircraft presently being used in passenger-carrying service.

The seating arrangement as described herein is particularly adaptable for use in a commercial airliner. In Fig. 3 there is shown an application of the invention in two different types of aircraft. In a wider type airplane having three abreast seating on one side of the aisle and two seats on the other side, such as the DC-7, the seating arrangement would appear as shown in the left side of Fig. 3. The narrower type airliner like the Convair which has two seats on each side of the aisle, is depicted in the right portion of Fig. 3. It will be noted that the seats are placed so that the front edges form an angle of less than 90° with the side of the airplane thereby allowing the passenger to see out the side windows more easily and comfortably.

It will be understood that the invention has been described with reference to a particular embodiment, that is, its application for use in a commercial airliner. By various changes and modifications, the invention would be useful in other applications without departing from true spirit and scope of the invention.

Having thus described my invention, what I claim as new and desire to secure by Letters Patent of the United States is:

1. A seating arrangement for use in passenger-carrying vehicles comprising sets of spaced seats arranged at an acute angle to the side wall of the vehicle, partially enclosed foot rests spaced forwardly of said seats and aligned therewith for supporting the feet of the occupants thereof, said foot rests having top portions positioned to serve as arm rests for the occupants of the next forward set of seats.

2. A seating arrangement for use in passenger-carrying vehicles comprising a first set of spaced seats arranged at an angle to the side wall of the vehicle, partially enclosed foot rests spaced forward of said seats and aligned therewith for supporting the feet of the occupants thereof, a second set of spaced seats disposed forward of said first set and laterally separated to allow for the positioning of said foot rests therebeside, said foot rests having top portions serving as arm rests for the occupants of said second set of spaced seats.

3. In a seating arrangement for use in passenger-carrying vehicles, a first set of seats having back rests attached thereto, a second set of seats having back rests attached thereto and disposed forwardly of said first set and spaced longitudinally therefrom, said sets of seats including laterally separated seat units, partially enclosed foot rests in alignment with said first set of seats and positioned beside the seat units of said second set of seats, each of said foot rests being provided with an opening for insertion of the feet of the occupant of the correspondingly aligned seat, a foldable tray attached to the upper rim portion of the opening in said foot rest, and means for positioning said trays for use by the occupants of the correspondingly aligned seats.

4. The seating arrangement described in claim 3 wherein substantially all of the passenger-carrying seats are placed at an acute angle to the side wall of the vehicle, said angle being so chosen that the occupants of said seats can more readily see out of windows placed in the side of the vehicle.

5. In a seating arrangement for passenger-carrying vehicles, a first seat having a back rest attached thereto, second and third seats laterally separated from each other and located forwardly of said first seat, partially enclosed foot rests disposed beside said second and third seats and aligned with said first seat for supporting the feet of the occupant thereof, a leg rest placed between said first seat and its corresponding foot rest to support the legs of the occupant of said first seat, said leg rest being adapted to be moved into the foot rest to permit ready access to said first seat, the top portion of said foot rests serving as arm rests for the occupants of said second and third seats.

References Cited in the file of this patent

UNITED STATES PATENTS

| | | |
|---|---|---|
| D. 105,993 | Loewy et al. | Sept. 7, 1937 |
| D. 110,791 | Armour | Aug. 9, 1938 |
| D. 154,773 | Haman et al. | Aug. 9, 1949 |
| 1,893,458 | Tatum | Jan. 3, 1933 |
| 2,280,065 | DeRoode | Apr. 21, 1942 |
| 2,414,730 | Flogaus | Jan. 21, 1947 |
| 2,419,498 | Newton | Apr. 22, 1947 |
| 2,434,857 | Larson | Jan. 20, 1948 |
| 2,602,490 | Earl | July 8, 1952 |
| 2,668,582 | Goodfellow | Feb. 9, 1954 |

FOREIGN PATENTS

| | | |
|---|---|---|
| 647,809 | France | Aug. 6, 1928 |
| 590,030 | Great Britain | July 7, 1947 |
| 811,841 | Germany | Aug. 23, 1951 |
| 733,081 | Great Britain | July 6, 1955 |